Sept. 1, 1925.
F. W. DAVIS
1,552,119
FUEL CONSUMPTION INDICATOR
Filed Jan. 23, 1922
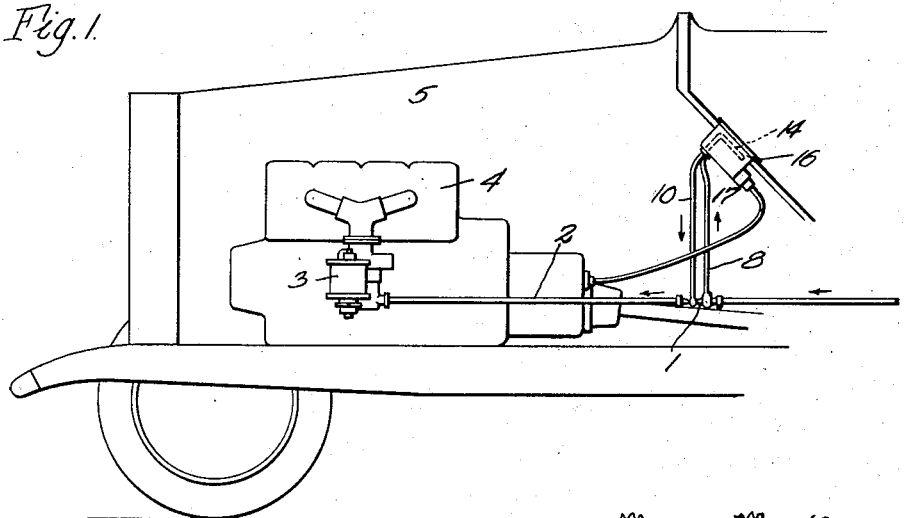
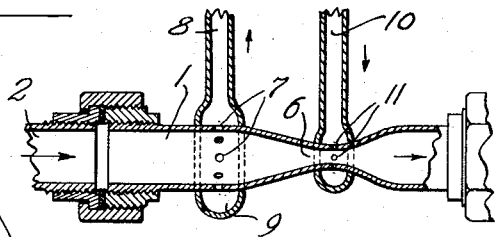
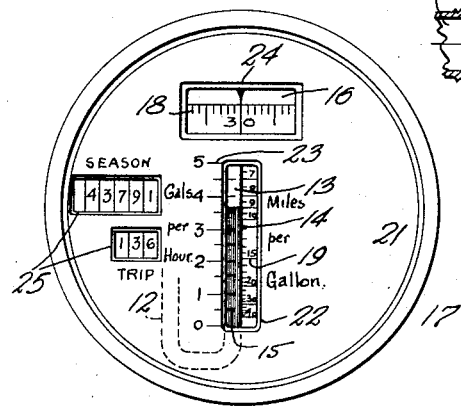
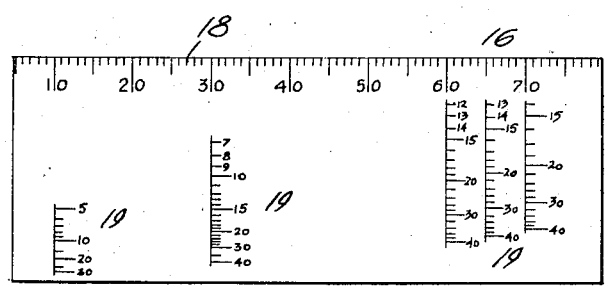
INVENTOR.
Francis W. Davis,
by Parker & Rockwood.
ATTORNEYS.

Patented Sept. 1, 1925.

1,552,119

UNITED STATES PATENT OFFICE.

FRANCIS W. DAVIS, OF BUFFALO, NEW YORK.

FUEL-CONSUMPTION INDICATOR.

Application filed January 23, 1922. Serial No. 531,021.

*To all whom it may concern:*

Be it known that I, FRANCIS W. DAVIS, a citizen of the United States, residing at Buffalo, in the county of Erie and State of New York, have invented a new and useful Improvement in Fuel-Consumption Indicators, of which the following is a specification.

My invention relates to improvements in liquid fuel consumption indicators for vehicles operated by internal combustion engines.

One of the objects of my invention is to provide an extremely simple indicator preferably arranged so as to be readily visible from the driver's seat for showing at all times while the vehicle is running the amount of gasoline or other liquid fuel consumed by the engine. More specifically my invention is designed for directly indicating the number of miles per gallon of fuel obtained by a vehicle engine at different speeds of travel.

For the purpose of disclosing my invention I have illustrated one embodiment in the accompanying drawings, in which:

Fig. 1 is a fragmentary side elevation of a vehicle operated by an internal combustion engine and which is provided with a fuel consumption indicator embodying the invention, Fig. 2 is a face view of a speedometer with which the fuel consumption indicator is associated, Fig. 3 is a fragmentary sectional plan of a portion of the "rate of flow" indicator, Fig. 4 is a fragmentary perspective view of another portion thereof, and Fig. 5 is a development layout of the calibrations on the rotatable drum of the indicator.

In the embodiment of the invention illustrated a Venturi tube 1 is provided in the fuel supply or feed pipe 2 leading to the carburetor 3 of an internal combustion engine 4 of the vehicle 5. This Venturi tube may take the form of a separate tube inserted in the feed line or, if desired, may be formed integrally with the feed pipe. As usual, this tube has a restricted waist 6 which tapers from the full diameter of the pipe in both directions. Suitable openings or ports 7 are provided in the intake end of this tube, which ports communicate with a conduit or pipe 8. This conduit preferably has a portion 9 surrounding the tube and ports, forming an annular channel around that portion of the feed tube having the ports 7, which preferably take the form of a series of small openings in the wall of the tube. A similar conduit 10 is connected with the restricted waist of the Venturi tube which likewise is provided with ports or openings 11 and these two conduits are connected to the respective legs 12 and 13 of a U shaped glass tube 14. The U-tube contains an indicating liquid which is preferably colored so as to be readily observed and is of greater specific gravity than gasoline and of such a composition that it will not dissolve in or mix with the gasoline or liquid fuel for the engine.

The structure thus above described provides a means for determining the quantity of fuel passing through the feed pipe of the engine in a given period of time. The difference in pressure between the liquid fuel in the enlarged portion of the Venturi tube and that in the restricted waist of the Venturi tube, which difference will vary with the rate at which the fuel passes through the feed pipe 2, will be indicated by the height of the liquid in the legs of the U-tube, thereby indicating the rate of flow of the fuel through the fuel feed pipe of the engine, when read in connection with a suitably calibrated scale 15. This scale is preferably calibrated to indicate gallons per hour passing through the feed pipe and may be marked on that leg of the U-tube connected with the restricted waist of the Venturi tube or on a face plate with which the tube is arranged to be associated and opposite the leg 13, or it may be marked on both.

The rate-of-flow indicator just described or any other form of indicator for showing the rate at which the fuel is fed to the engine is arranged in cooperative relation with a movable member adapted to move to different positions in accordance with the speed at which the vehicle is traveling. The rotatable cup or head 16 of a speedometer 17 is preferably utilized for this purpose. The speedometer, which may be of known or any suitable type, is, as usual, driven from some appropriate moving part of the vehicle and has the usual calibrated scale 18 preferably at the top edge of the cup which indicates the miles per hour at which the vehicle is moving. The cup is made longer than is usual in the ordinary speedometer or is provided with a skirt or extension on which is provided graduated scales 19 adapted to cooperate with the scale 15 of the U-tube in such a way as to indicate the distance in miles traveled by the vehicle per gallon of fuel consumed by the engine at the different speeds of the vehicle. These scales, as shown, are arranged in vertical columns on the cup and are calibrated to indicate the number of miles per gallon of fuel consumed by the engine. To this end the vertical scales 19 have a definite relation to the speed scale 18 which is arranged horizontally around the cup to indicate the miles per hour at which the vehicle is traveling. I have illustrated only a few of these fuel consumption scales 19. Those illustrated show the number of gallons of fuel per mile consumed by the engine when the vehicle is running at ten, thirty, sixty, sixty-five and seventy miles respectively per hour. Each of the scales 19 is arranged vertically in line with its related speed indication on the scale 18 so as to show the miles per gallon consumption of fuel when the vehicle is traveling at the speed indicated by the number on the scale 18 in alinement with said vertical scale 19. These scales 19, however, are merely illustrative and a greater number of scales can be used if desired. The cup of the speedometer is arranged adjacent to that leg 13 of the U-shaped tube connected with the restricted waist of the Venturi tube in such a manner that the vertical scales on the speedometer cup can be readily read in cooperation with the level of the liquid in the leg 13 of the U-shaped tube. To this end the U-shaped tube as well as the speedometer cup is mounted behind the face plate 21 of the speedometer, which face plate is provided with a vertical slot 22 therein through which the tube 13 and one of the scales 19 on the speedometer cup can be observed. If desired, the scale 15, instead of being placed directly upon the tube, may be placed on one vertical edge of the slot or, as shown in the drawings, a scale 23 indicating the gallons per hour of fuel consumed by the engine is marked on the face plate at the edge of the slot 22 which coincides with the graduations 15 on the glass tube itself. The height of the column of liquid in the leg 13 of the U-tube varies with changes in the feed of the fuel to the engine, and the number on the scale 23 opposite the top of the liquid column at any time will show the amount of fuel per hour being consumed, while the number on the exposed scale 19 opposite the top of the column will show the miles being traveled per gallon of fuel consumed. The elongated slot 22, through which the miles per gallon fuel consumption may be observed, is preferably arranged immediately beneath the transversely extending slot 24 through which the speed scale 18 is read. At one side of the slot are the usual openings 25 in the face of the speedometer through which the figures of an odometer, mounted in the speedometer casing, may be read. The structure thus provided is preferably mounted on the instrument board of the vehicle and the driver may thus readily observe his total mileage, his trip mileage and at any time the speed at which he is travelling and the miles per gallon of fuel consumed when travelling at said speed. In addition he may readily observe the gallons of fuel consumed per hour either while the vehicle is running or when the engine is running idle.

I claim as my invention:

1. In a fuel consumption indicator for an explosive engine having a Venturi meter through which the liquid fuel flows to the engine, movable means actuated by the liquid in the vertical pipes of said Venturi meter and responsive to variations in the height of the liquid in said vertical pipes, and a scale cooperating with said movable means and calibrated to indicate the rate of consumption of fuel by the engine.

2. In a fuel consumption indicator for explosive engines of vehicles, having a Venturi tube arranged in the fuel feed pipe of said engine, a U-shaped transparent tube containing an indicating liquid, the legs of said U-tube communicating respectively with the enlarged and restricted portions of said Venturi tube whereby variations in the flow of fuel in said Venturi tube will cause movement of said indicating liquid in said U-tube, and a member movable to different positions by the variations in speed of the vehicle and having indicia calibrated to cooperate with the different levels of said indicating liquid to indicate the rate of consumption of fuel by the engine at different speeds of the vehicle.

3. In a fuel consumption indicator for explosive engines of vehicles, having a Venturi tube arranged in the fuel feed pipe of the engine, a U-shaped transparent tube containing an indicating liquid and having the vertical legs thereof communicating respectively with the enlarged portion of the Venturi tube on the intake end thereof and with the restricted portion of the tube whereby variations in the flow of fuel in said Venturi tube will cause movement of said indicating liquid to different levels in said U-tube, a speedometer cup movable to different positions in accordance with different speeds of the vehicle and having indicia thereon calibrated to cooperate with the different levels of said indicating liquid to indicate the rate of consumption of fuel by the engine at different speeds of the vehicle.

4. In a fuel consumption indicator for explosive engines, having a fuel feed pipe with a Venturi tube in said feed pipe, a U-shaped transparent tube containing an indicating liquid, the legs of said U-tube communicating respectively with the enlarged and restricted portions of said Venturi tube whereby variations in the flow of fuel in said Venturi tube will cause movement of said indicating liquid in said U-tube, and a scale cooperating with said indicating liquid and calibrated to indicate the rate of consumption of fuel by the engine.

5. In a fuel consumption indicator for explosive engines, having a Venturi tube through which the liquid fuel flows to the engine, a liquid column operatively connected with said Venturi tube so that the position of the column changes with variations in the flow of fuel through the Venturi tube, and a scale cooperating with said liquid column and calibrated to indicate the rate of consumption of fuel by the engine.

6. In a fuel consumption indicator for explosive engines of vehicles, having a Venturi tube through which the liquid fuel flows to the engine, a liquid column operatively connected with said Venturi tube so that the position of the column changes with variations in the flow of fuel through the Venturi tube, and a vehicle speed indicator having a member which changes position with variations in the speed of the vehicle and is provided with a scale which cooperates with said liquid column to indicate the rate of consumption of fuel by the engine at different speeds of the vehicle.

FRANCIS W. DAVIS.